United States Patent
Cho (10) Patent No.: US 9,352,767 B2
(45) Date of Patent: May 31, 2016

(54) METHOD OF APPLYING ELECTRICALLY CONDUCTIVE HEATING ELEMENT ON SURFACE OF RIM OF STEERING WHEEL

(71) Applicant: Hwajin Co., Ltd., Gyeongsangbuk-do (KR)

(72) Inventor: Man Ho Cho, Gyeonggi-do (KR)

(73) Assignee: Hwajin Co., Ltd. (KR)

( * ) Notice: Subject to any disclaimer, the term of this patent is extended or adjusted under 35 U.S.C. 154(b) by 314 days.

(21) Appl. No.: 13/902,445

(22) Filed: May 24, 2013

(65) Prior Publication Data

US 2013/0248507 A1 Sep. 26, 2013

Related U.S. Application Data

(63) Continuation of application No. PCT/KR2011/002809, filed on Apr. 20, 2011.

(30) Foreign Application Priority Data

Feb. 14, 2011 (KR) .................. 10-2011-0012865

(51) Int. Cl.
*B60L 1/02* (2006.01)
*B62D 1/06* (2006.01)
*H05B 3/34* (2006.01)

(52) U.S. Cl.
CPC *B62D 1/06* (2013.01); *B62D 1/065* (2013.01); *H05B 3/34* (2013.01); *H05B 2203/014* (2013.01); *H05B 2203/017* (2013.01); *Y10T 29/49083* (2015.01)

(58) Field of Classification Search
CPC ............. B62D 1/065; B62D 1/06; H05B 3/34
USPC ......... 219/204, 202, 206, 209, 543, 528, 529, 219/549, 519, 467
See application file for complete search history.

(56) References Cited

U.S. PATENT DOCUMENTS

| | | | |
|---|---|---|---|
| 6,762,394 B2 * | 7/2004 | Hobby | B62D 1/065 219/202 |
| 2003/0111453 A1 * | 6/2003 | Haag | B62D 1/065 219/204 |
| 2004/0155029 A1 | 8/2004 | Haag | |

FOREIGN PATENT DOCUMENTS

| | | |
|---|---|---|
| CN | 1529995 A | 9/2004 |
| JP | 2001-048024 A | 2/2001 |

(Continued)

OTHER PUBLICATIONS

Office Action, and partial translation thereof, in corresponding Chinese Application No. 201180063027.X, dated Jan. 6, 2014, 11 pages.

(Continued)

*Primary Examiner* — Phuong Nguyen
(74) *Attorney, Agent, or Firm* — Brinks Gilson & Lione (57) ABSTRACT

A method relates to applying an electrically conductive heating element to a surface of a rim of a steering wheel. The rim of the steering wheel is structured such that a plurality of heating elements formed of a conductive paste is applied to outer circumferential surfaces of a rim. A first connection element for electrically connecting the heating elements is applied along circumferential edges of the rim contacting a separation space. A second connection element formed of a conductive paste and adapted to electrically connect the first connection elements is applied in the separation space.

10 Claims, 9 Drawing Sheets

(56) References Cited

FOREIGN PATENT DOCUMENTS

| | | |
|---|---|---|
| JP | 2002-535811 A | 10/2002 |
| JP | 2005-512881 A | 5/2005 |
| JP | 2010-076556 A | 4/2010 |
| JP | 2011-504442 A | 2/2011 |
| KR | 20-1991-0011426 | 7/1991 |
| KR | 10-1992-0019598 | 11/1992 |
| KR | 20-1998-0002418 | 3/1998 |
| KR | 10-2003-0066573 | 8/2003 |
| KR | 10-2006-0005316 | 1/2006 |
| KR | 10-2009-0095849 A | 9/2009 |
| KR | 10-2010-0090621 | 8/2010 |
| KR | 10-2011-0038530 | 4/2011 |
| KR | 10-2011-0096850 | 8/2011 |
| WO | WO 00/43225 A2 | 7/2000 |
| WO | WO 03/053762 A1 | 7/2003 |
| WO | WO 2009/050519 A1 | 4/2009 |

OTHER PUBLICATIONS

Office Action, and partial translation thereof, in corresponding Japanese Application No. 2013-540876, dated Mar. 13, 2014, 5 pages.
International Search Report and Written Opinion for International Application No. PCT/KR2011/002809, mailed Feb. 29, 2012.

* cited by examiner

METHOD OF APPLYING ELECTRICALLY CONDUCTIVE HEATING ELEMENT ON SURFACE OF RIM OF STEERING WHEEL

PRIORITY

This application is a continuation of Patent Cooperation Treaty (PCT) international application Serial No. PCT/KR2011/002809, filed on Apr. 20, 2011 and which designates the United States, which claims priority to Korean Patent Application No. 10-2011-0012865, filed on Feb. 14, 2011.The entirety of both Patent Cooperation Treaty (PCT) international application Serial No. PCT/KR2011/002809 and Korean Patent Application No. 10-2011-0012865 are hereby incorporated by reference herein.

BACKGROUND OF THE INVENTION

1. Technical Field

The present disclosure relates to a method of applying an electrically conductive heating element to a surface of a rim of a steering wheel, and more particularly, to a method of applying an electrically conductive heating element to an entire surface of a rim of a steering wheel in order for a user to hold the rim without any temperature discomfort in winter, particularly applying an electrically conductive connection element into a space between molding materials constituting the rim to electrically connect heating elements of the molding materials.

2. Related Art

A rim of a steering wheel is a driver-manipulated element of a steering system of a vehicle. In this regard, many studies have been conducted to improve its esthetic appearance, convenience of holding, use of functional elements therewith, etc.

In particular, when starting to drive a vehicle in winter, the temperature of a rim of a steering wheel is lower than that of the human body, which affects the driver and might cause a safety problem. Accordingly, various apparatuses for heating a rim of a steering wheel to a temperature higher than that of the human body have been studied.

Figure 1:
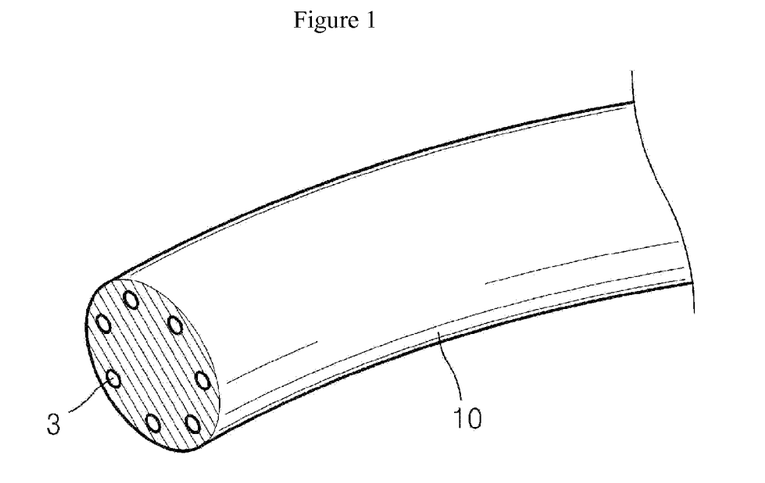
FIGS. 1 and 2 are schematic views illustrating a steering wheel having a conventional heating structure.

In a conventional technique for heating a rim of a steering wheel, as disclosed in Korean Utility Model Application No. 1989-0020599, Korean Patent Application No. 1992-0000945, and Korean Utility Model Application No. 1996-16958, heating coils 3 are buried in a rim portion 10 of a steering wheel, as shown in FIG. 1.

Figure 2:
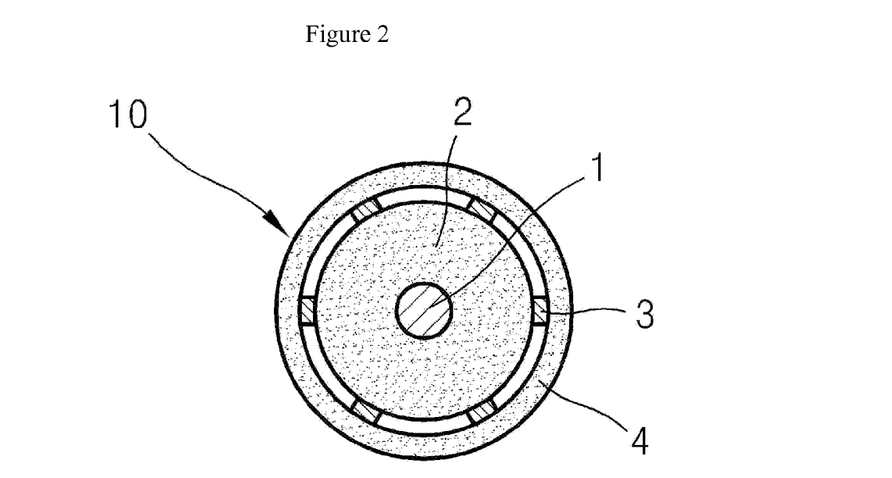

In order to bury the heating coils 3, as shown in FIG. 2, an insulating covering material 2 is coated around a core 1 and the heating coils 3 are bonded to an outer circumferential surface of the insulating covering material 2. Next, a surface of the rim portion 10 is finished by using a finishing member 4 such as a synthetic resin.

Figure 3:
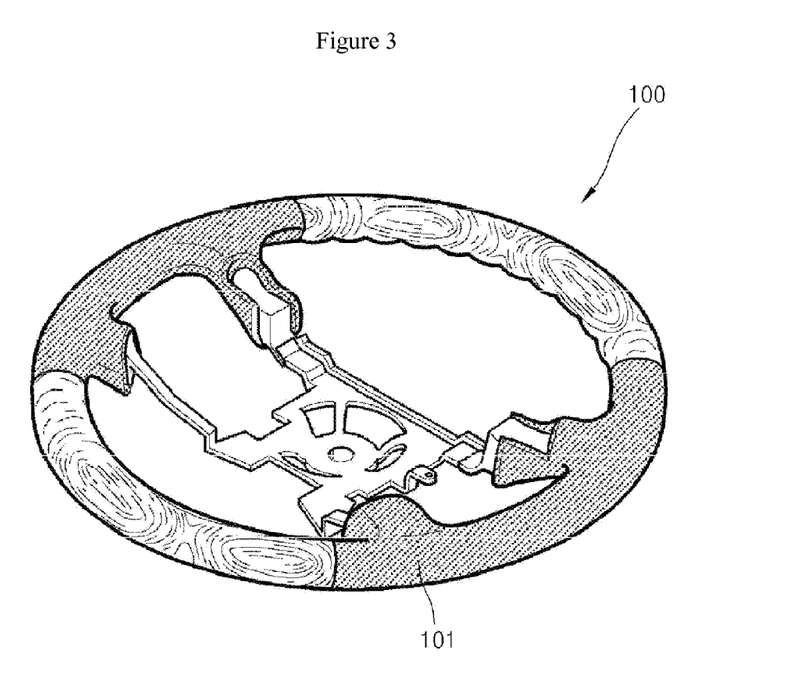
FIG. 3 is a perspective view illustrating a conventional steering wheel.

It is difficult to adopt the heating coils 3 that are heating elements if a steering wheel 100, as shown in FIG. 3, employs an aesthetic decoration element such as a leather 101. That is, an outer circumferential surface of the steering wheel 100 is surrounded by the leather 101 in order to improve the appearance of the steering wheel 100. In this case, the leather 101 is cut into small pieces in order to minimize loss of the leather 101 and then the small pieces are sewed, thereby inevitably producing seamed portions.

Figure 4:
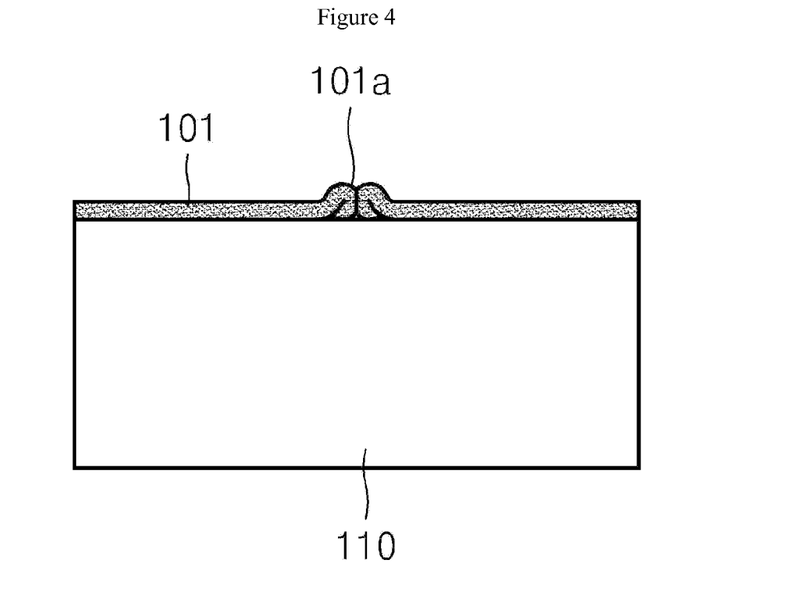
FIG. 4 is a cross-sectional view illustrating a conventional rim for explaining problems caused by a seamed portion of a leather.

As shown in FIG. 4, a seamed portion 101a of the leather 101 protrudes because two pieces overlap to increase a thickness of the leather 101, thereby making it uncomfortable to handle the steering wheel 100.

Figure 5:
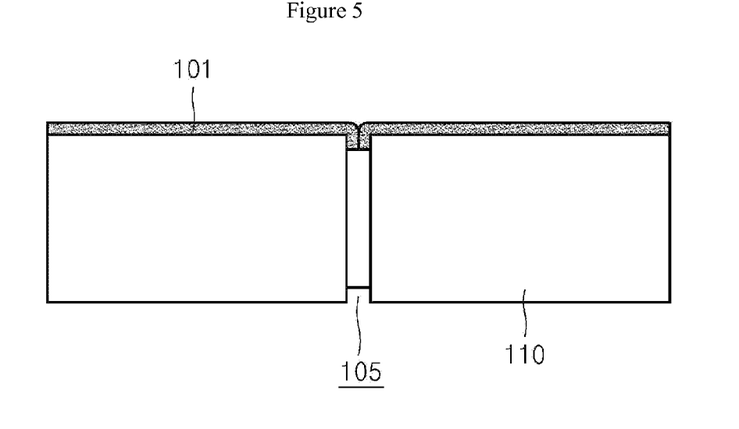
FIG. 5 is a cross-sectional view illustrating a case where the problems of FIG. 4 are solved.

In order to solve this problem, as shown in FIG. 5, a processing groove 105 for processing the seamed portion 101a is formed in a rim 110.

When heating coils are buried in the rim 110, however, it is difficult to electrically connect the heating coils due to the processing groove 105.

Figure 6:
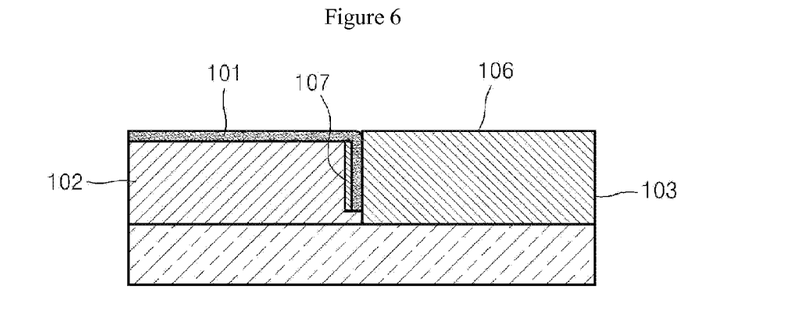
FIG. 6 is a cross-sectional view illustrating another conventional rim.

Also, in order to further improve the appearance of the steering wheel 100, as shown in FIG. 6, a section is formed of a first molding material 102 such as urethane foam and finished with the leather 101 that is genuine leather, and a remaining section is formed of a second molding material 103 such as acrylonitrile butadiene styrene (ABS) or rigid urethane and processed to have a pattern 106 such as a wood pattern, a hair pattern, or a marble pattern by using a hydraulic transfer method.

Even in this case, like in FIG. 5, a processing groove for processing end portions of the leather 101 is formed, thereby making it difficult to electrically connect the buried heating coils.

In particular, the processing groove of FIG. 6 has a depth that is 2 times or more greater than the processing groove 105 for processing the seamed portion 101a of the leather 101 of FIG. 5 because the processing groove of FIG. 6 has to have a depth great enough to maintain an adhesive force of an adhesive 107 that is used to finish the leather 101. Also, the processing groove of FIG. 6 has a width that is about ½ of that of the processing groove 105 for processing the seamed portion 101a of the leather 101 of FIG. 5 because two pieces of the leather 101 are inserted into the processing groove 105 for finishing the leather 101 of FIG. 5 whereas one piece of the leather 101 is inserted into the processing groove for distinguishing the first and second molding materials 102 and 103 of FIG. 6. Accordingly, it is more difficult to bury heat generating elements in the rim 110 including the processing groove of FIG. 6 than in the rim 110 including the processing groove 105 of FIG. 5.

Also, heating elements may be formed by, instead of burying heating coils in the rim 110, applying a conductive coating material to a surface of the steering wheel 100 by using a spray method or printing a conductive coating material onto a surface of the steering wheel 100 by using a pad printing method and then drying the conductive coating material. If the spray method is used, a coating film 120 may have a smaller thickness at the processing groove 105, and if the pad printing method is used, the inside of the processing groove 105 may not be printed.

Figure 7:
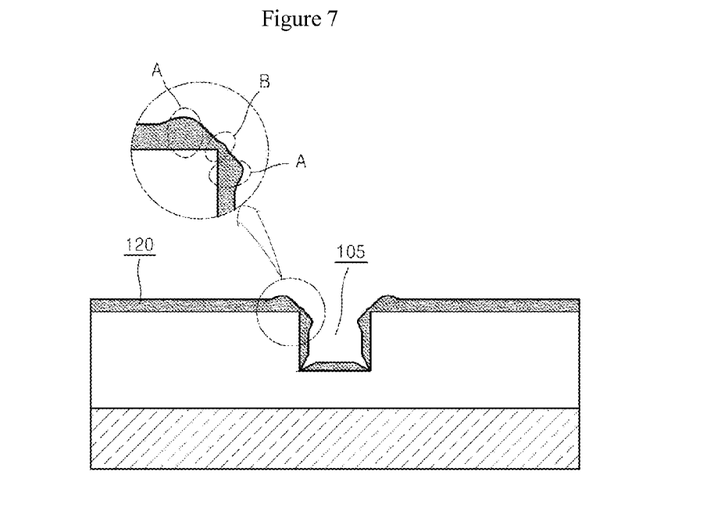
FIG. 7 is a schematic view for explaining problems of a conventional processing groove.

That is, as shown in FIG. 7, the coating film 120 may have a greater thickness (A) around an edge portion of the processing groove 105 because the conductive coating material is attracted around an edge portion of the processing groove 105 due to surface tension, or may have a less thickness (B) at the edge portion of the processing groove 105 due to electrostatic induction. Accordingly, electric charges may not smoothly flow through the processing groove 105, and the conductive coating material may peel off in a subsequent process such as a process of surrounding the leather 101.

Also, if the coating film 120 is formed on the processing groove 105 by using the spray method, bubbles may be generated, thereby leading to poor flow of electric charges and irregularity in the thickness of the coating film 120.

SUMMARY OF THE INVENTION

The present disclosure provides a rim of a steering wheel and a method of applying an electrically conductive heating element to a surface of the rim of the steering wheel, which may smoothly electrically connect heating elements for heating a plurality of molding materials even though there is a space between the plurality of molding materials constituting the rim.

The method according to the present disclosure has the following effects. The method may enable a user to hold a rim without any temperature discomfort in winter by employing heating elements to lead to safe driving and smoothly electrically connect the heating elements even though a processing groove for finishing end portions of a leather is formed between molding materials constituting the rim.

Second, the method may remove irregularity in the thickness of the heating elements due to surface tension or electrostatic induction at an edge portion of the processing groove, which a conventional spray method encounters, by applying a connection element by using a pad member.

Third, the method may continuously perform a coating operation by applying the connection element in the processing groove by using a nozzle, thereby improving productivity.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The above and other features and advantages of the present disclosure will become more apparent by describing in detail exemplary forms thereof with reference to the attached drawings in which.

DETAILED DESCRIPTION OF THE INVENTION

The present disclosure as described herein may be embodied in a number of different embodiments and/or forms. Not all of the depicted components may be required, however, and some implementations may include additional, different, or fewer components from those expressly described in this disclosure. Variations in the arrangement and type of the components may be made without departing from the spirit or scope of the claims as set forth herein.

The present disclosure provides a rim of a steering wheel and a method of applying an electrically conductive heating element to a surface of the rim of the steering wheel, which may smoothly electrically connect heating elements for heating a plurality of molding materials even though there is a space between the plurality of molding materials constituting the rim.

The present disclosure also provides a rim of a steering wheel and a method of applying an electrically conductive heating element on a surface of the rim of the steering wheel, which may enable electric charges to smoothly flow between heating elements applied to molding materials even though there is a space between the molding materials.

According to an aspect of the present disclosure, there is provided a method of applying a heating element, which is an electrically conductive paste, to a surface of a rim of a steering wheel in which a processing groove in which a leather is inserted is formed, wherein the method includes attaching the heating element having a predetermined pattern to a surface of a first pad member that is soft; pressing the first pad member on the surface of the rim and attaching the heating element to the surface of the rim; applying first connection elements that are adjacent to each other and electrically connect the heating element along circumferential edges of end portions of the surface of the rim contacting the processing groove; and applying a second connection element, which is a conductive paste, to a wall surface and a bottom surface of the processing groove to electrically connect the first connection elements.

In one embodiment, a thickness of the first connection elements and the second connection element may be greater than a thickness of the heating element. In another embodiment, applying of the second connection element may include applying the second connection element to the wall surface and the bottom surface of the processing groove by attaching the second connection element to a surface of a second pad member that is soft and inserting the second pad member into the processing groove.

In further another embodiment, applying of the second connection element may include applying the second connection element to the wall surface and the bottom surface of the processing groove by using a nozzle having nozzle holes through which the second connection element is ejected. In another embodiment, applying of the second connection element may include applying the second connection element to an edge portion of the leather and inserting the edge of the leather into the processing groove to electrically connect the first connection elements.

According to another aspect of the present disclosure, there is provided a method of applying a heating element, which is an electrically conductive paste, to a surface of a rim of a steering wheel in which a processing groove in which a seamed portion of a leather is inserted is formed, wherein the method includes attaching the heating element having a predetermined pattern to a surface of a first pad member that is soft; pressing the first pad member on the surface of the rim and attaching the heating element to the surface of the rim; and applying a third connection element, which is a conductive paste, to circumferential edges of end portions of the surface of the rim contacting the processing groove and a wall surface and a bottom surface of the processing groove, to electrically connect first connection elements that are adjacent to each other.

In one embodiment, applying of the third connection element may include applying the third connection element to the circumferential edge of the surface of the rim contacting the processing groove and the wall surface and the bottom surface of the processing groove by attaching the third connection element to a surface of a third pad member that is soft and inserting the third pad member into the processing groove.

A rim of a steering wheel manufactured by a method of embodiment of the present disclosure may enable a user to drive a vehicle without any temperature discomfort in winter by employing heating elements and heating the rim to a temperature higher than that of the human body, and particularly, may smoothly electrically connect the heating elements applied to a surface of the rim even though there is a processing groove for processing a finishing member such as a leather that is inserted into the rim.

Also, the rim of the steering wheel of the embodiment of the present disclosure may directly transfer a transfer film having a decoration pattern layer onto a surface of the heating element, adopt an aesthetic decoration pattern layer such as a wood pattern, and provide a sense of a soft touch when the driver holds the rim.

Figure 8A:
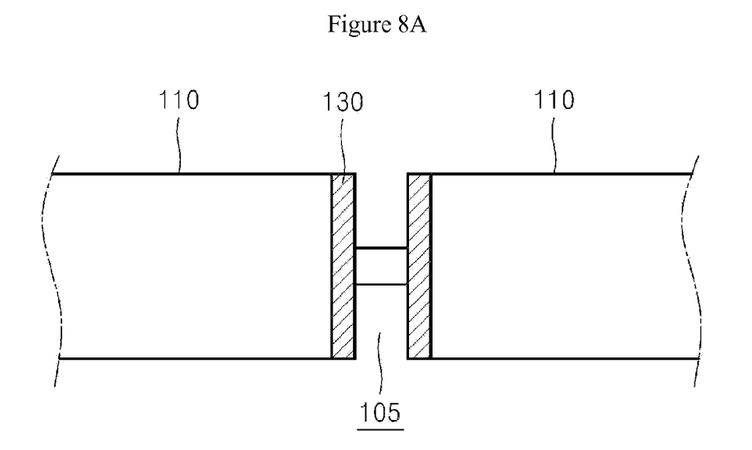
FIGS. 8A through 8D are cross-sectional views illustrating a method according to an embodiment of the present disclosure.
Figure 8B:
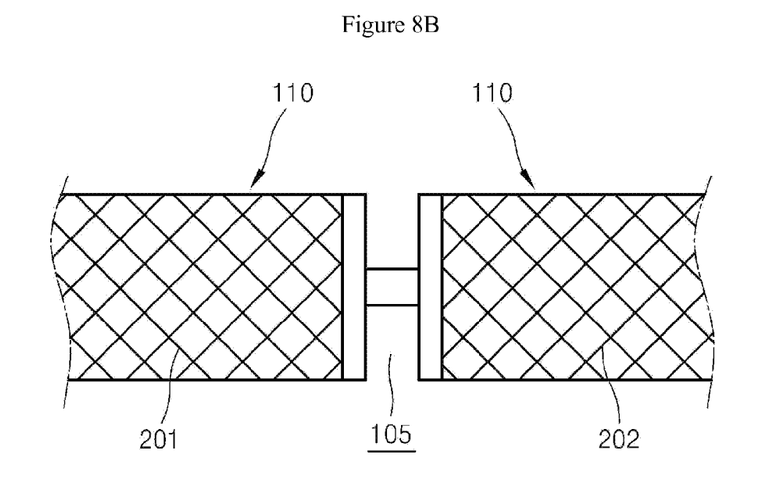
Figure 8C:
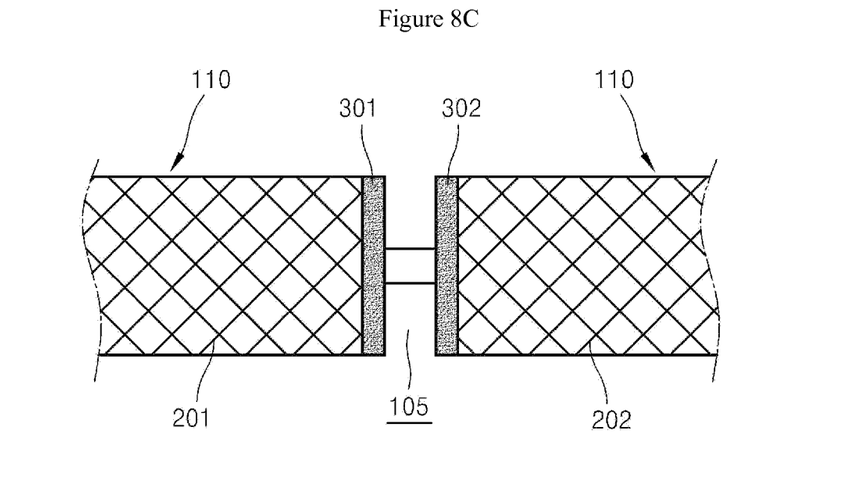
Figure 8D:
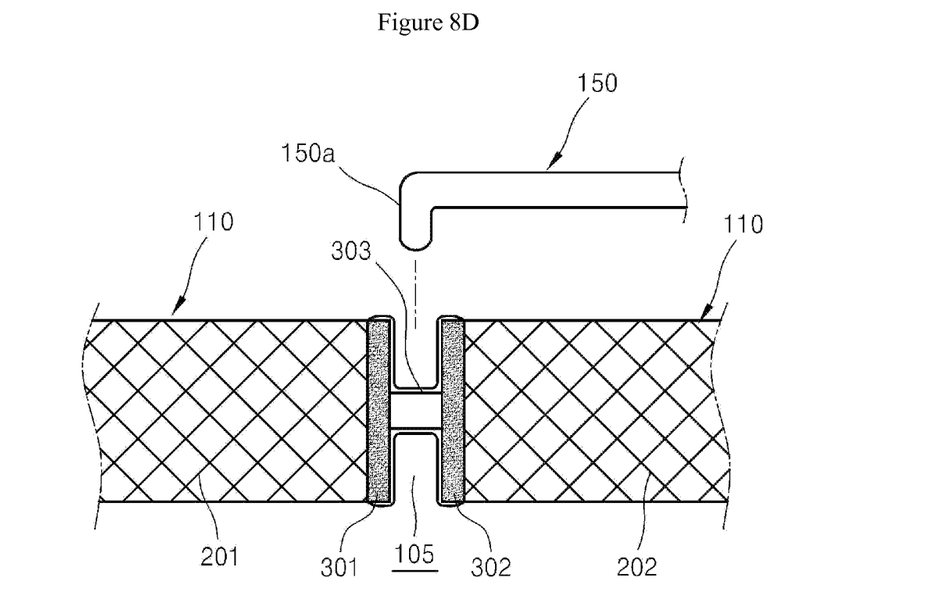

A rim 110 of a steering wheel according to an embodiment of the present disclosure is structured as shown in FIG. 8D such that a plurality of heating elements 201 and 202 formed of a conductive paste are applied to an outer circumferential surface of the rim 110, and end portions (seamed portion 150a) of a leather 150 are inserted into a processing groove 105.

Power is supplied to the heating elements 201 and 202 to generate heat and thus when a driver holds the rim 110, the heat is transferred. The heating elements 201 and 202 are applied in lattice patterns so that even though any portion is broken, power is continuously supplied.

First connection elements 301 and 302 for electrically connecting the heating elements 201 and 202 applied in lattice patterns are applied along circumferential edges of end portions of the surface of the rim 110 contacting the processing groove 105, and a second connection element 303 formed of a conductive paste and adapted to electrically connect the first connection elements 301 and 302 applied to the rim 110 are applied to the end portions of the surface of the rim 110 and a wall surface and a bottom surface of the processing groove 105.

Figure 9:
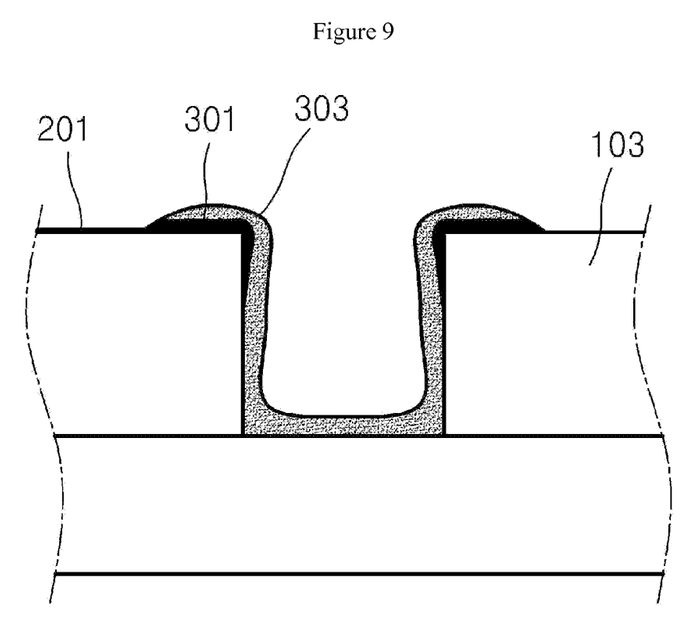
FIG. 9 is a cross-sectional view illustrating a process performed at a processing groove.

Referring to FIG. 9, at an edge portion of the processing groove 105, a thickness of the first and second connection elements 301, 302, and 303 is greater than a thickness of the heating elements 201 and 202, thereby enabling current to smoothly flow through the edge portion of the processing groove 105.

Figure 10:
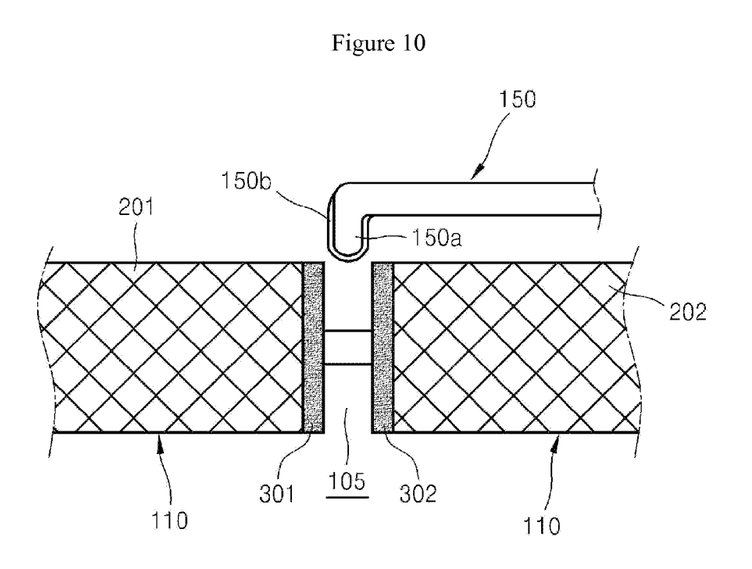
FIG. 10 is a cross-sectional view illustrating a method according to another embodiment of the present disclosure.

A rim of a steering wheel according to another embodiment of the present disclosure is structured as shown in FIG. 10 such that the first connection elements 301 and 302 for electrically connecting the heating elements 201 and 202 applied in lattice patterns are applied along the circumferential edges of the end portions of the surface of the rim 110 contacting the processing groove 105, and the edge portion 150a of the leather 150 coated with a conductive paste 150b is inserted into the processing groove 105 to electrically connect the first connection elements 301 and 302, which are adjacent to each other. In this case, the second connection element 303 (see FIG. 9) does not need to be applied into the narrow processing groove 105.

A method of applying electrically conductive heating elements to a surface of the rim 110 of the steering wheel as described above will now be explained.

Figure 11:
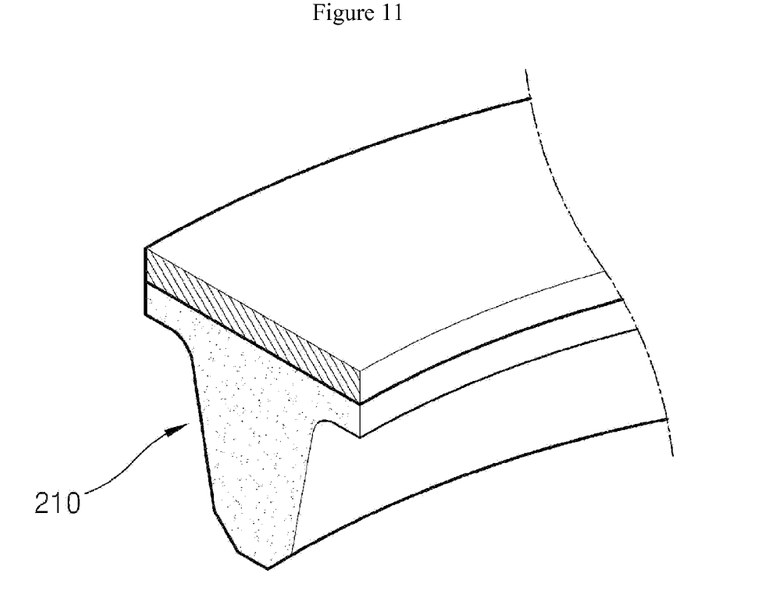
FIGS. 11 and 12 are schematic views illustrating a pad member used in the method of the present disclosure.

First, the heating elements 201 and 202 having predetermined patterns illustrated in FIG. 8B are attached to a surface of a first pad member 210 that is soft, as shown in FIG. 11. The heating elements 201 and 202 may be attached in their own patterns to the first pad member 210 by applying a conductive paste to a metal plate (not shown) on which the patterns of the heating elements 201 and 202 are formed and pressing the first pad member 210 on the metal plate on which the patterns are formed.

Next, as shown in FIG. 8B, the first pad member 210 is pressed on the surface of the rim 110 and the heating elements 201 and 202 are attached to the surface of the rim 110.

As shown in FIG. 8A, the above-described process of attaching the heating elements 201 and 202 to the first pad member 210 and the rim 110 may be performed after circumferential edges of the end portions of the surface of the rim 110 may be masked with shield members 130. It would be understood by one of ordinary skill in the art that the process of masking the rim 110 with the shield members 130 is optional and does not depart from the scope of the present disclosure.

As shown in FIG. 8B, after the shield members 130 are removed, the heating elements 201 and 202 are not applied to the circumferential edges of the end portions of the surface of the rim 110. That is, since any heating element is not applied to the edge portion of the processing groove 105, irregularity in the thickness of the heating elements 201 and 202 due to surface tension and electrostatic induction is avoided.

It is preferable that the shield members 130 are removed after the heating elements 201 and 202 are dried.

Next, as shown in FIG. 8C, the first connection elements 301 and 302 for electrically connecting the heating elements 201 and 202 are applied along the circumferential edges of the end portions of the surface of the rim 110 contacting the processing groove 105.

Next, as shown in FIG. 8D, the second connection element 303, which is a conductive paste, is applied to a wall surface and a bottom surface of the processing groove 105 to electrically connect the first connection elements 301 and 302, which are adjacent to each other.

In the above-described process, a thickness of the first connection elements 301 and 302 and the second connection element 303 is greater than a thickness of the heating elements 201 and 202, in order to enable electric charges to smoothly flow through the edge portion of the processing groove 105.

Figure 12:
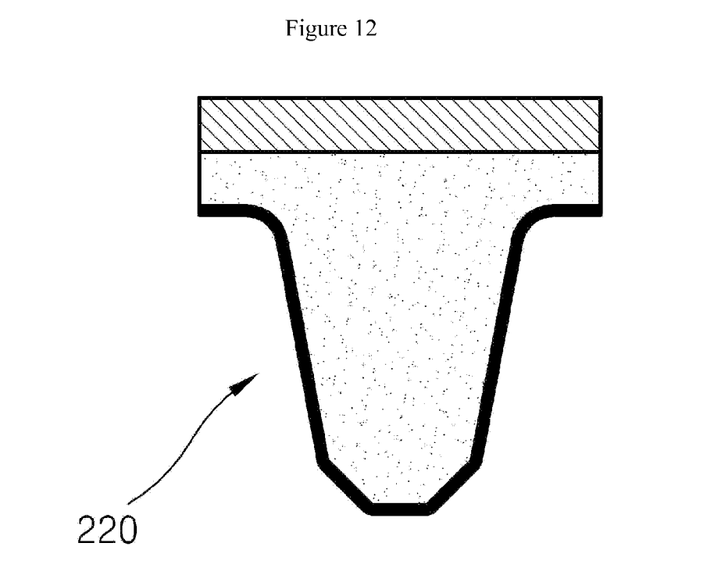

The second connection element 303 may be applied to the wall surface and the bottom surface of the processing groove 105, as shown in FIG. 12, by attaching the second connection element 303 to a surface of a second pad member 220 that is soft and inserting the second pad member 220 into the processing groove 105.

Figure 13:
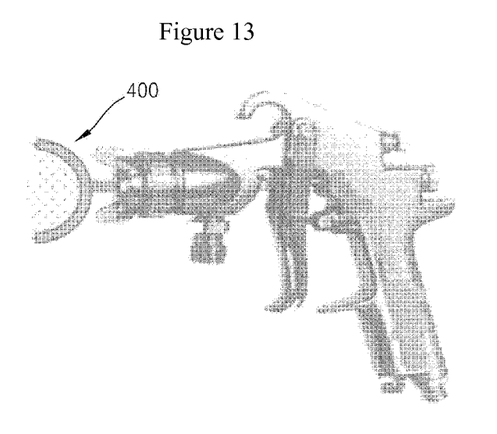
FIG. 13 is a schematic view illustrating a nozzle and a nozzle gun used in the method of the present disclosure.
Figure 14:
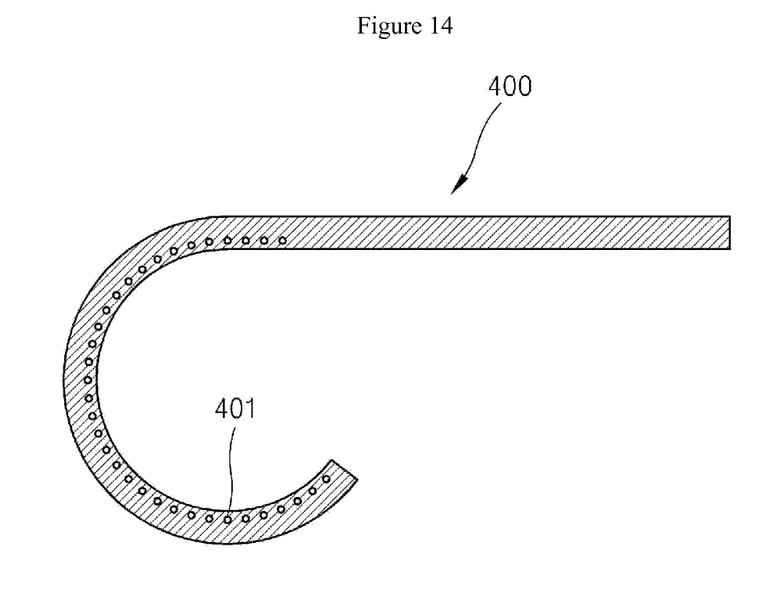
FIGS. 14 and 15 are cross-sectional views illustrating nozzles according to embodiment of the present disclosure.
Figure 15:
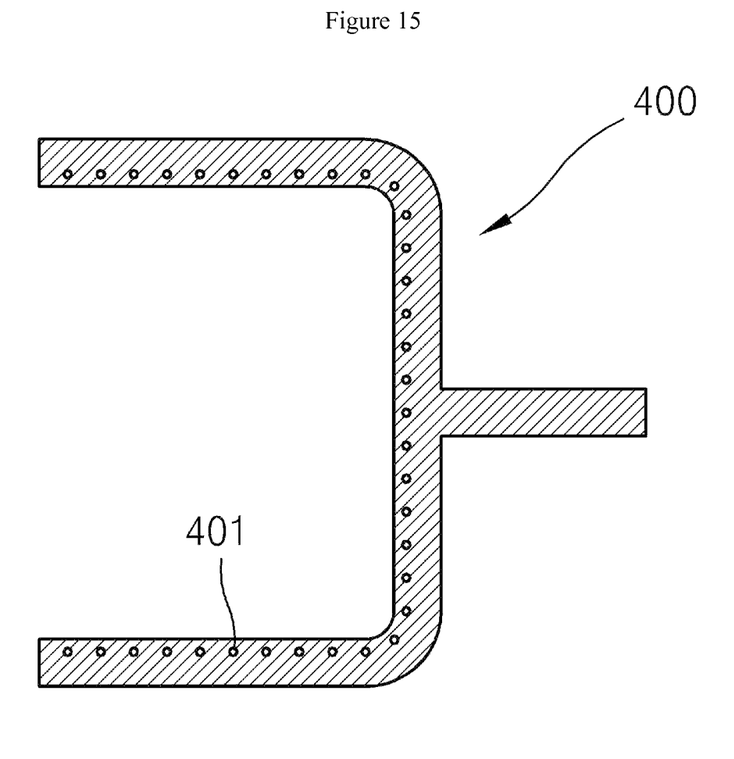

Alternatively, the second connection element 303 may be applied to the wall surface and the bottom surface of the processing groove 105, as shown in FIG. 13, by being ejected through a nozzle 400 in which nozzle holes 401 are formed. A shape of the nozzle 400 may vary as shown in FIGS. 14 and 15 according to a shape of the processing groove 105. In other embodiments, it would be understood that the second connection element 303 that is a conductive paste may be applied in other ways.

After the shield members 130 are removed, a third connection element (not shown), which is a conductive paste, may be applied at once to the circumferential edges (from which the shield members 130 are removed) of the end portions of the surface of the rim 110 contacting the processing groove 105 and the wall surface and the bottom surface of the processing groove 105, in order to make processes of separately applying the first and second connection elements 301, 302, and 303 unnecessary. In this case, the second pad member 220, as shown in FIG. 12, may be used.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

I claim:

1. A method of applying a heating element to a surface of a rim of a steering wheel, the method comprising:
    attaching the heating element having a predetermined pattern to a surface of a first pad member which is soft, the heating element comprising an electrically conductive paste;
    pressing the first pad member on the surface of the rim of the steering wheel and attaching the heating element to the surface of the rim, wherein the surface of the rim of the steering wheel has a processing groove for receiving a seamed portion of a leather and the heating element is not applied to an edge portion of the processing groove;
    mounting at least two first connection elements arranged adjacent to each other along circumferential edges of a first end portion and a second end portion of the surface of the rim, wherein the first and the second end portions of the surface of the rim are spaced apart from each other via the processing groove, the first connection elements being operable to electrically connect the heating element; and
    applying a second connection element to a wall surface and a bottom surface of the processing groove to electrically connect the two first connection elements, the second connection element comprising a conductive paste.

2. The method of claim 1, wherein a combined thickness of each of the first connection elements and the second connection element are greater than a thickness of the heating element.

3. The method of claim 1, wherein attaching the heating element comprises attaching the heating element such that the heating element does not extend to cover the circumferential edges of the first end portion and the second portion of the surface of the rim.

4. The method of claim 1, wherein applying the second connection element comprises:
    attaching the second connection element to a surface of a second pad member which is soft and
    inserting the second pad member into the processing groove.

5. The method of claim 1, wherein applying the second connection element comprises applying the second connection element to the wall surface and the bottom surface of the processing groove by using a nozzle having nozzle holes through which the second connection element is ejected.

6. The method of claim 1, wherein applying the second connection element comprises:
    applying the second connection element to an edge portion of the leather; and
    inserting the edge portion of the leather into the processing groove to electrically connect the first connection elements.

7. The method of claim 1, further comprising:
    masking with a shield member a circumferential edge of the first end portion and the second end portion of the surface of the rim before attaching the heating element.

8. The method of claim 7, further comprising:
    removing the shield member after the heating member is dried.

9. The method of claim 8, wherein attaching the heating element comprises attaching the heating element such that the heating element does not extend to cover the circumferential edges of the first end portion and the second portion of the surface of the rim.

10. A method of applying a heating element to a surface of a rim of a steering wheel, the method comprising:
    attaching the heating element having a predetermined pattern to a surface of a first pad member which is soft, the heating element comprising an electrically conductive paste;
    pressing the first pad member on the surface of the rim and attaching the heating element to the surface of the rim, wherein the surface of the rim of the steering wheel has a processing groove for receiving a seamed portion of a leather and the heating element is not applied to an edge portion of the processing groove; and
    applying a connection element to circumferential edges of end portions of the surface of the rim contacting the processing groove and a wall surface and a bottom surface of the processing groove, to electrically connect the heating element, the connection element comprising a conductive paste;
    wherein applying of the third connection element comprises:
    attaching the third connection element to a surface of a second pad member which is soft; and
    inserting the third pad member into the processing groove.

* * * * *